Oct. 4, 1932.  C. BARBIERI  1,880,663
FILLING AND CAPPING MACHINE FOR CONTAINERS
Filed Jan. 12, 1929  11 Sheets-Sheet 6
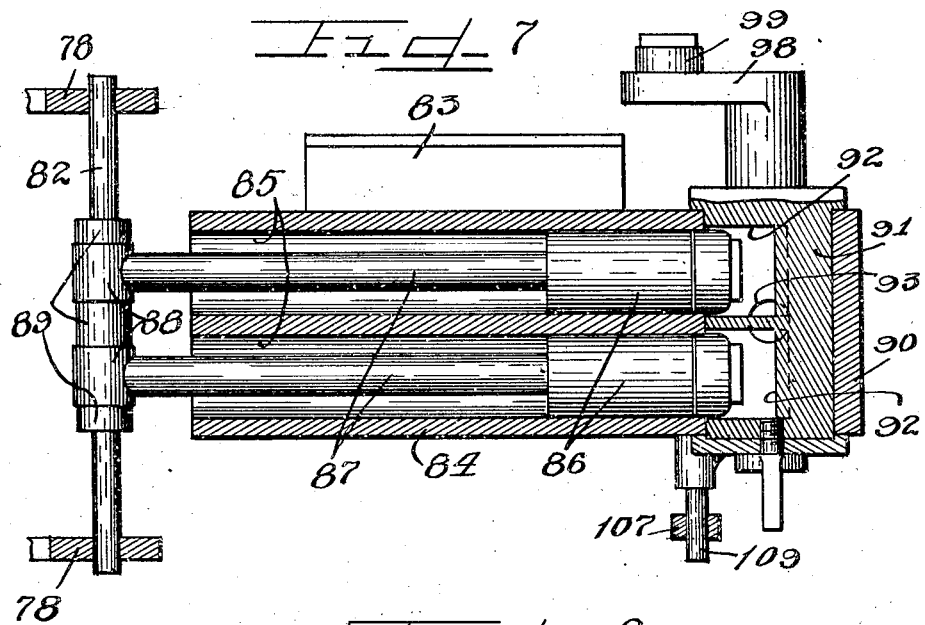
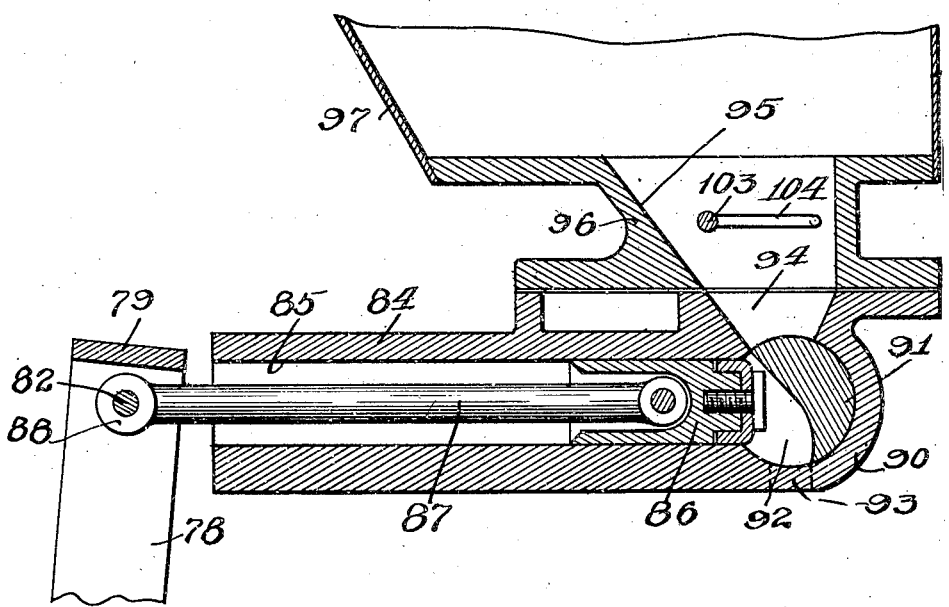
Inventor
Cesare Barbieri
by Charles... Attys

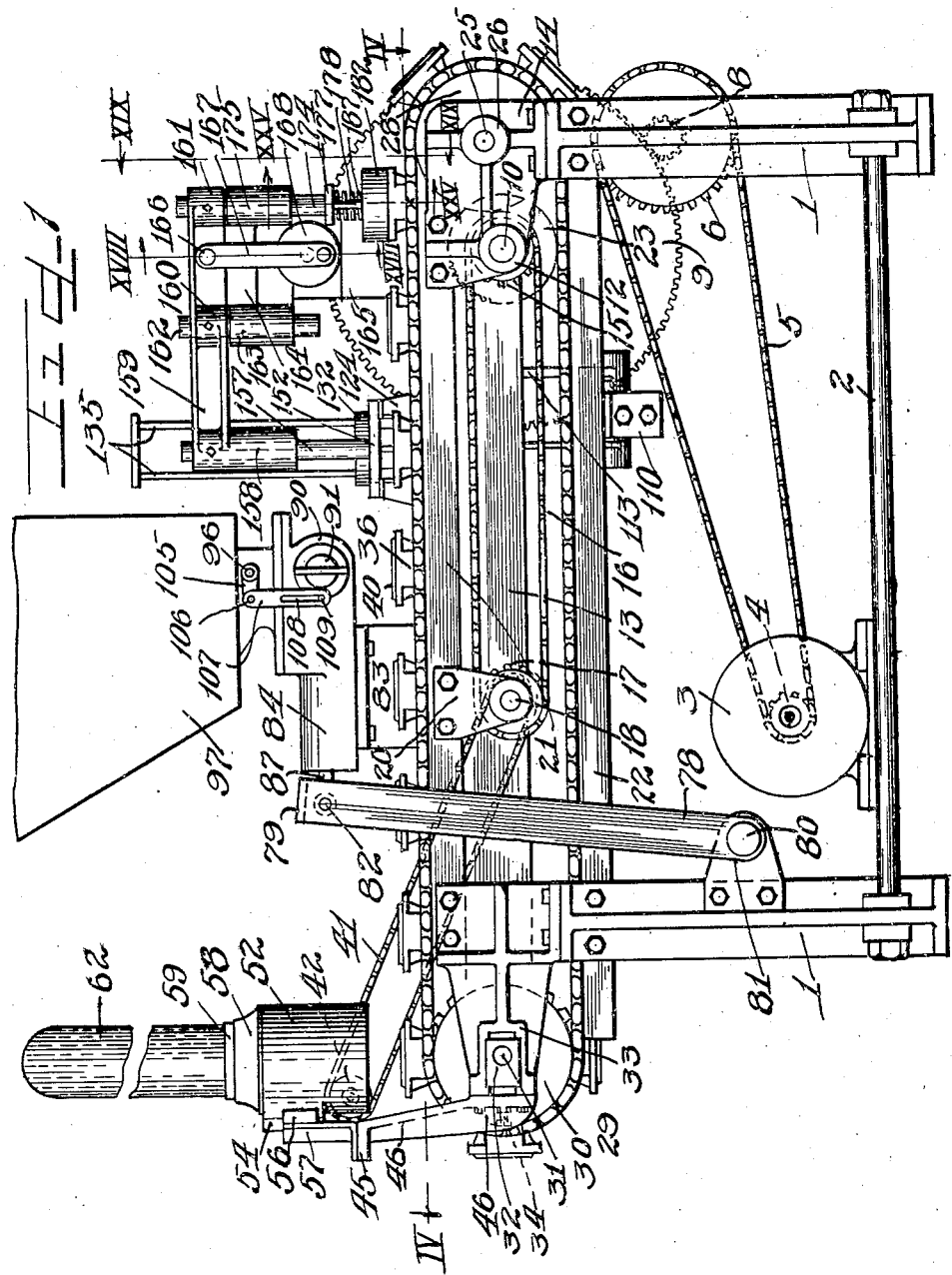
Oct. 4, 1932.    C. BARBIERI    1,880,663
FILLING AND CAPPING MACHINE FOR CONTAINERS
Filed Jan. 12, 1929    11 Sheets-Sheet 1

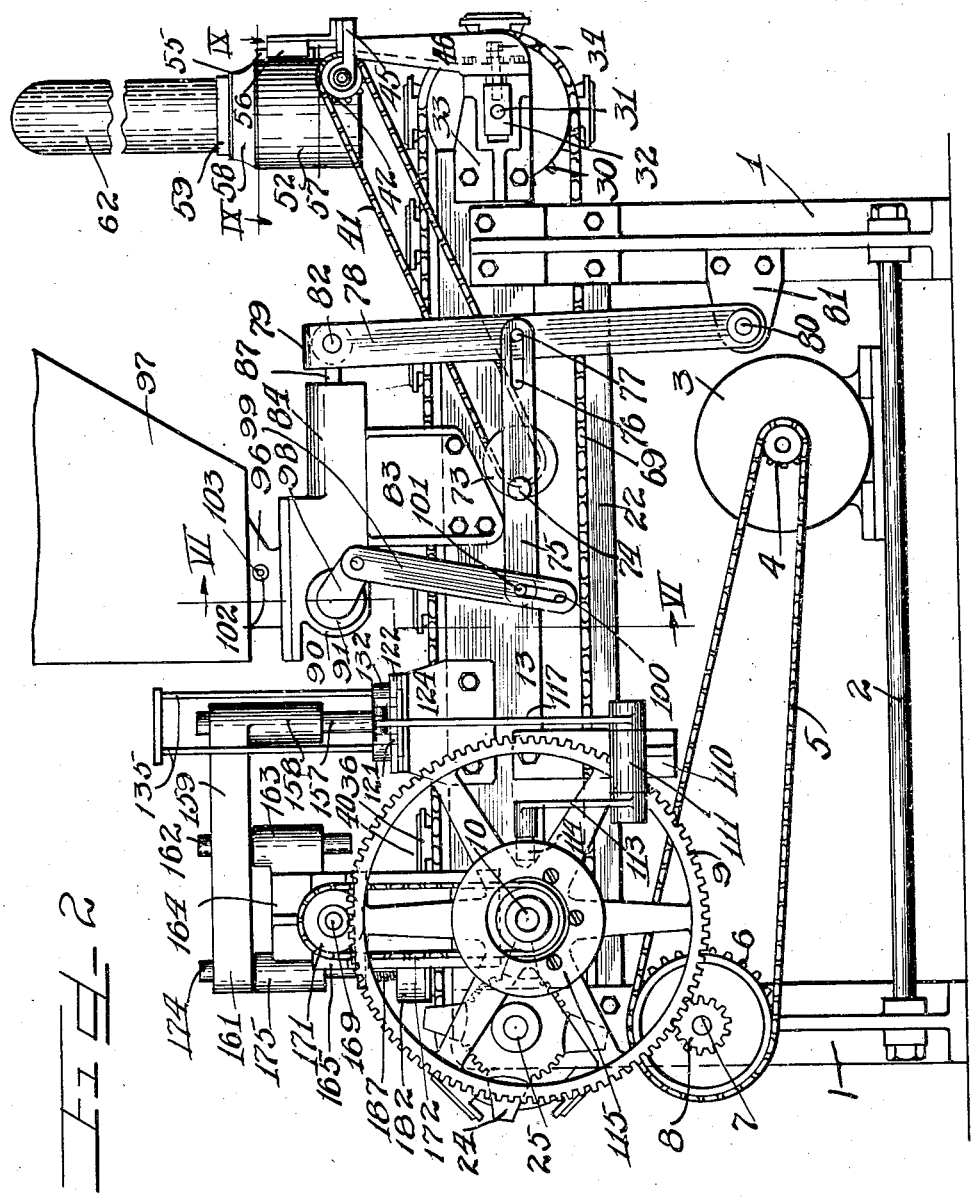

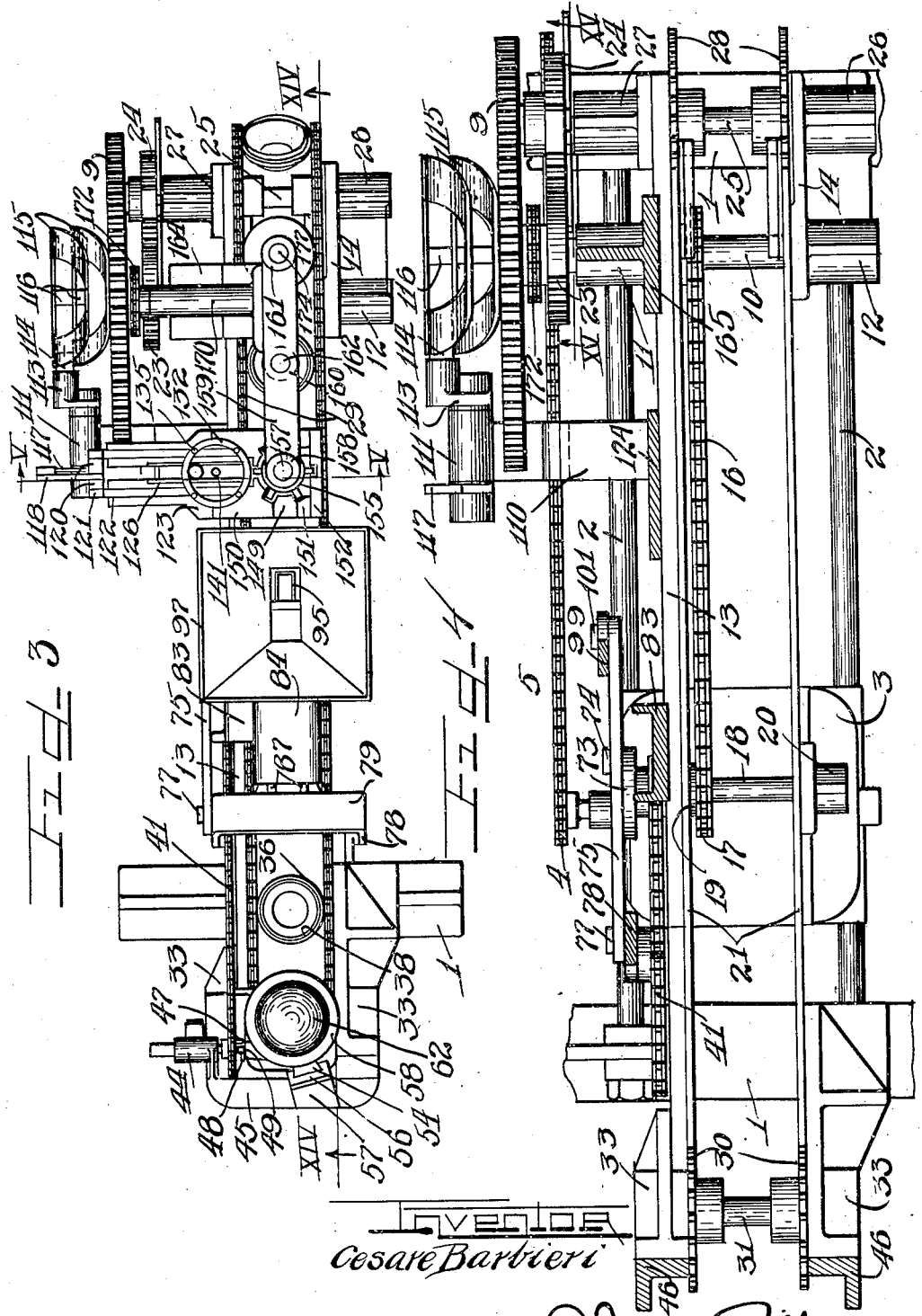

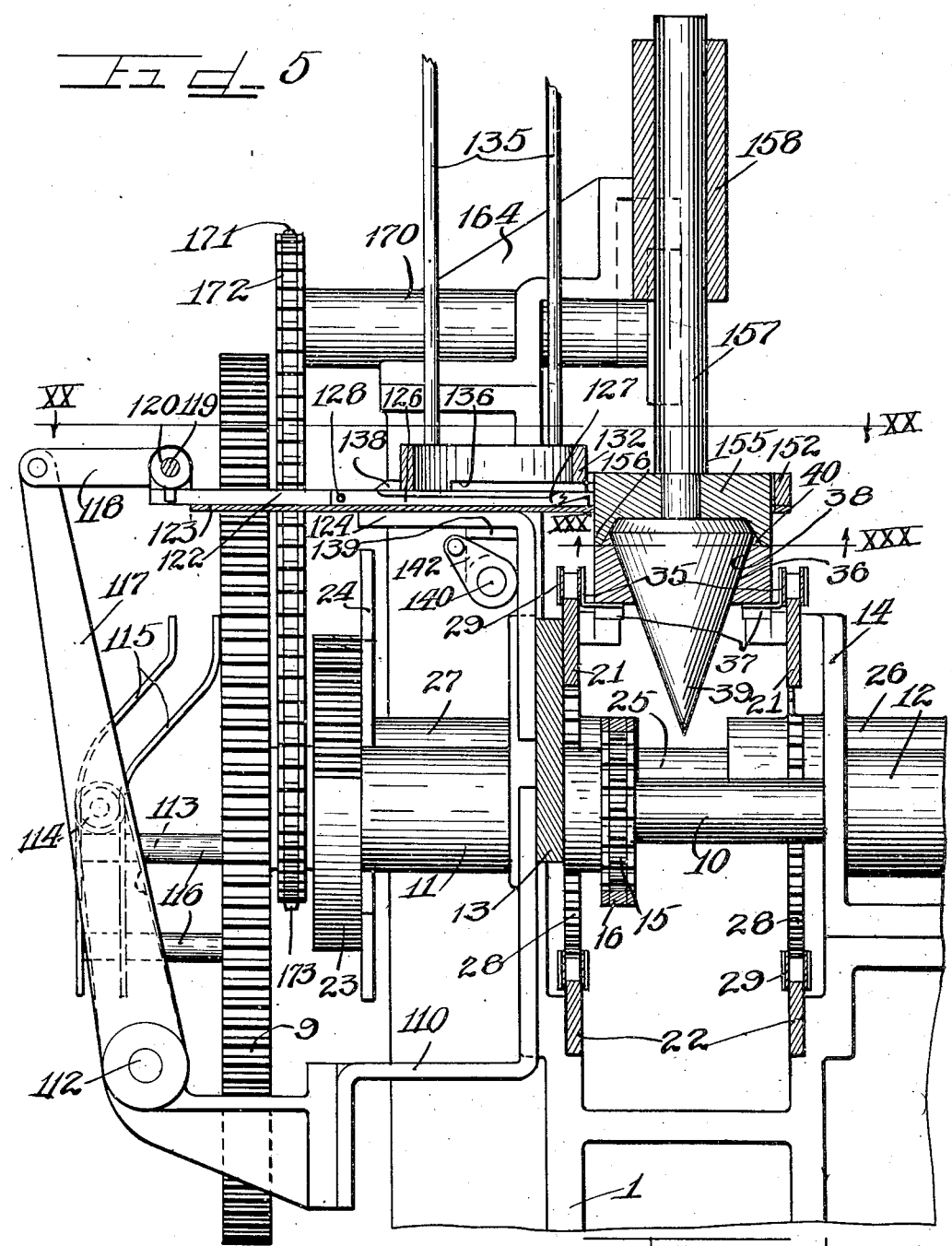

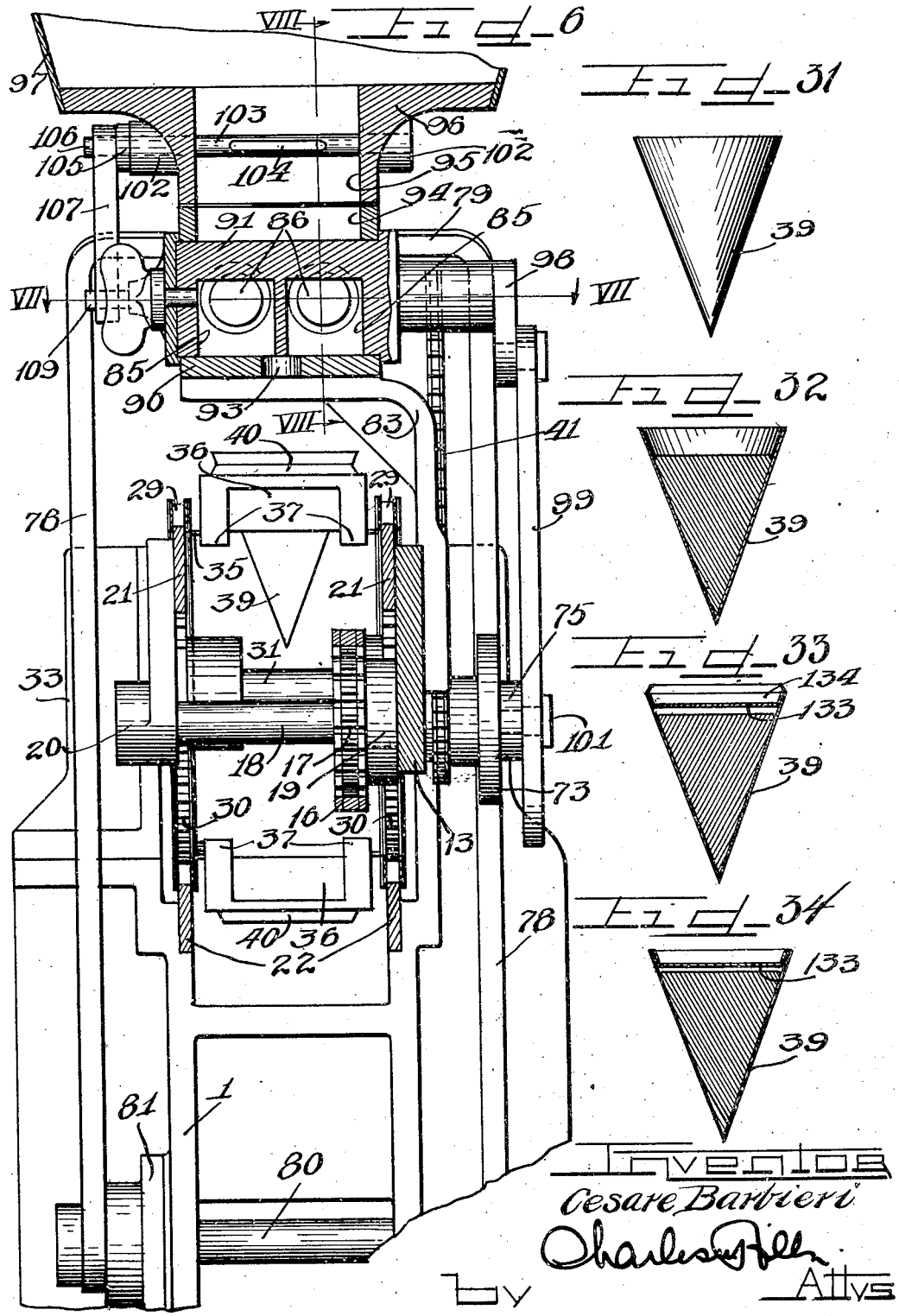

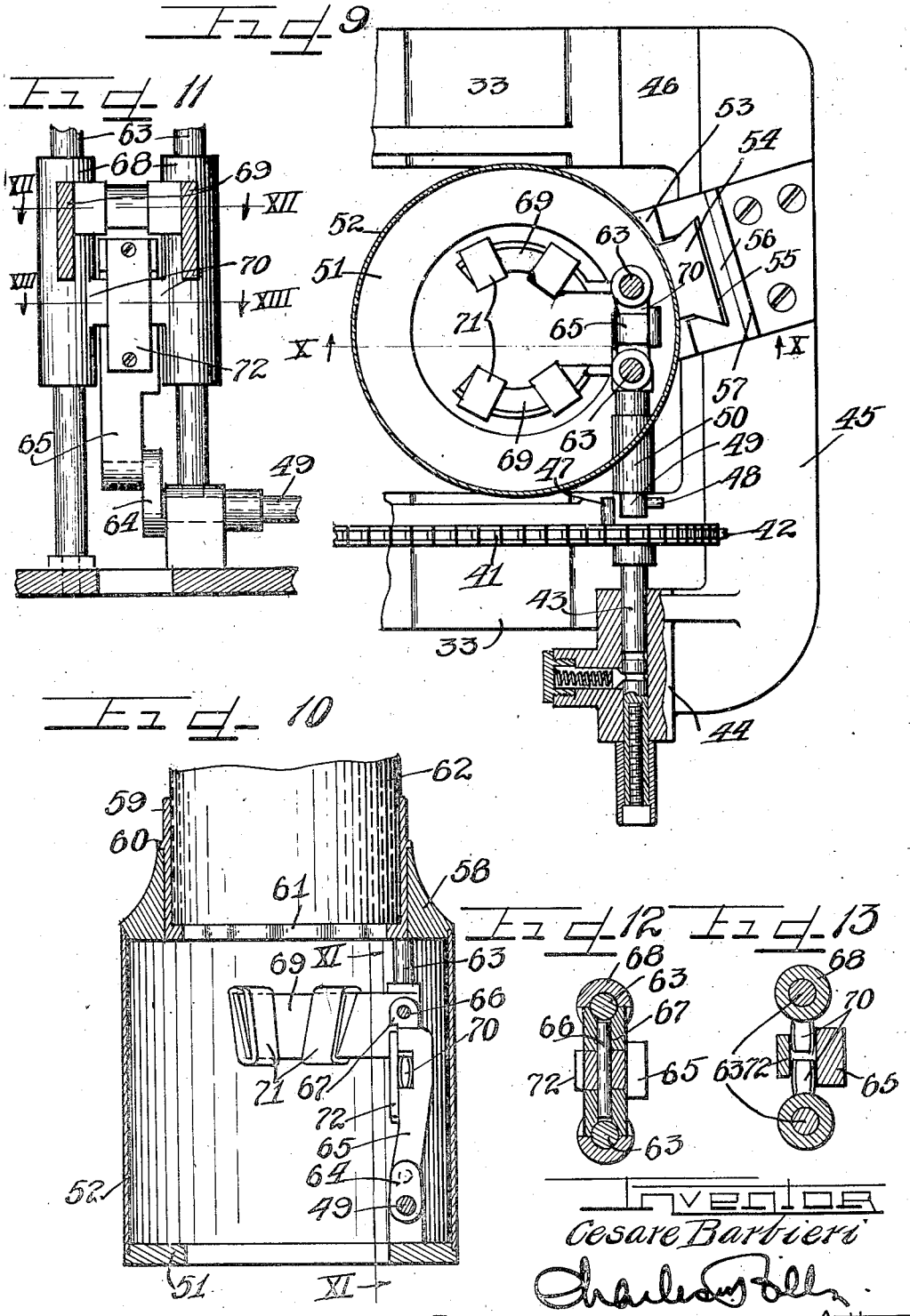

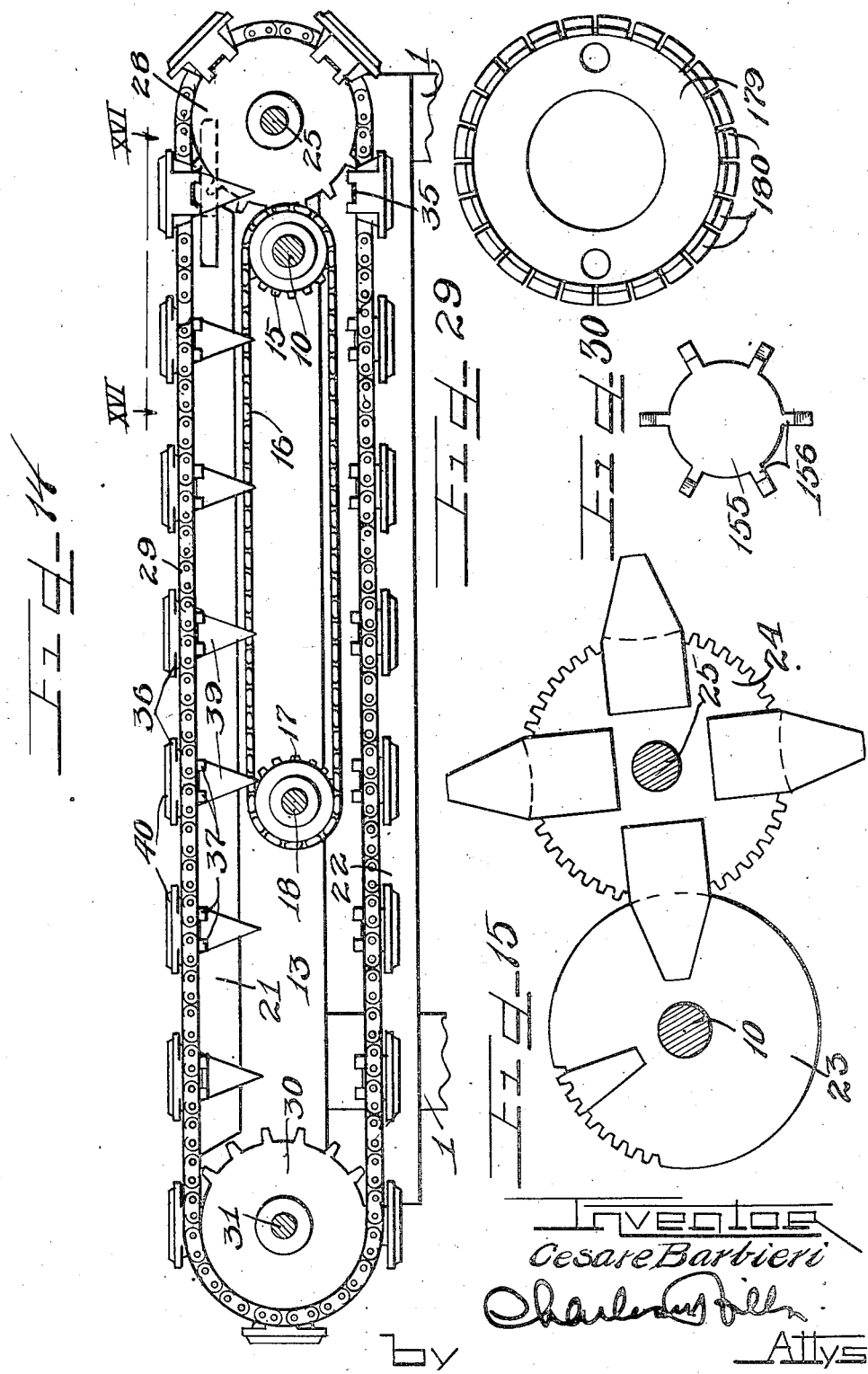

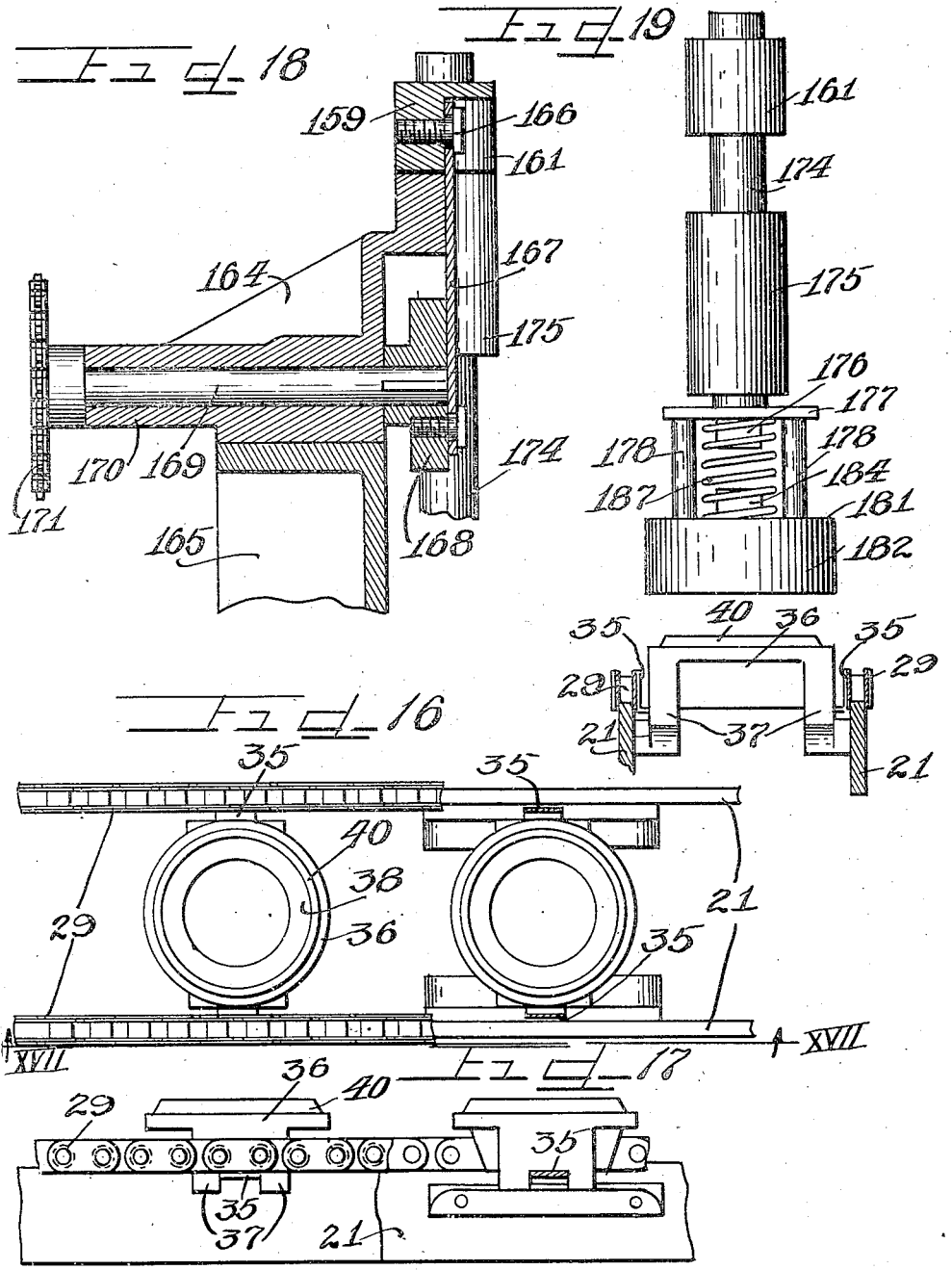

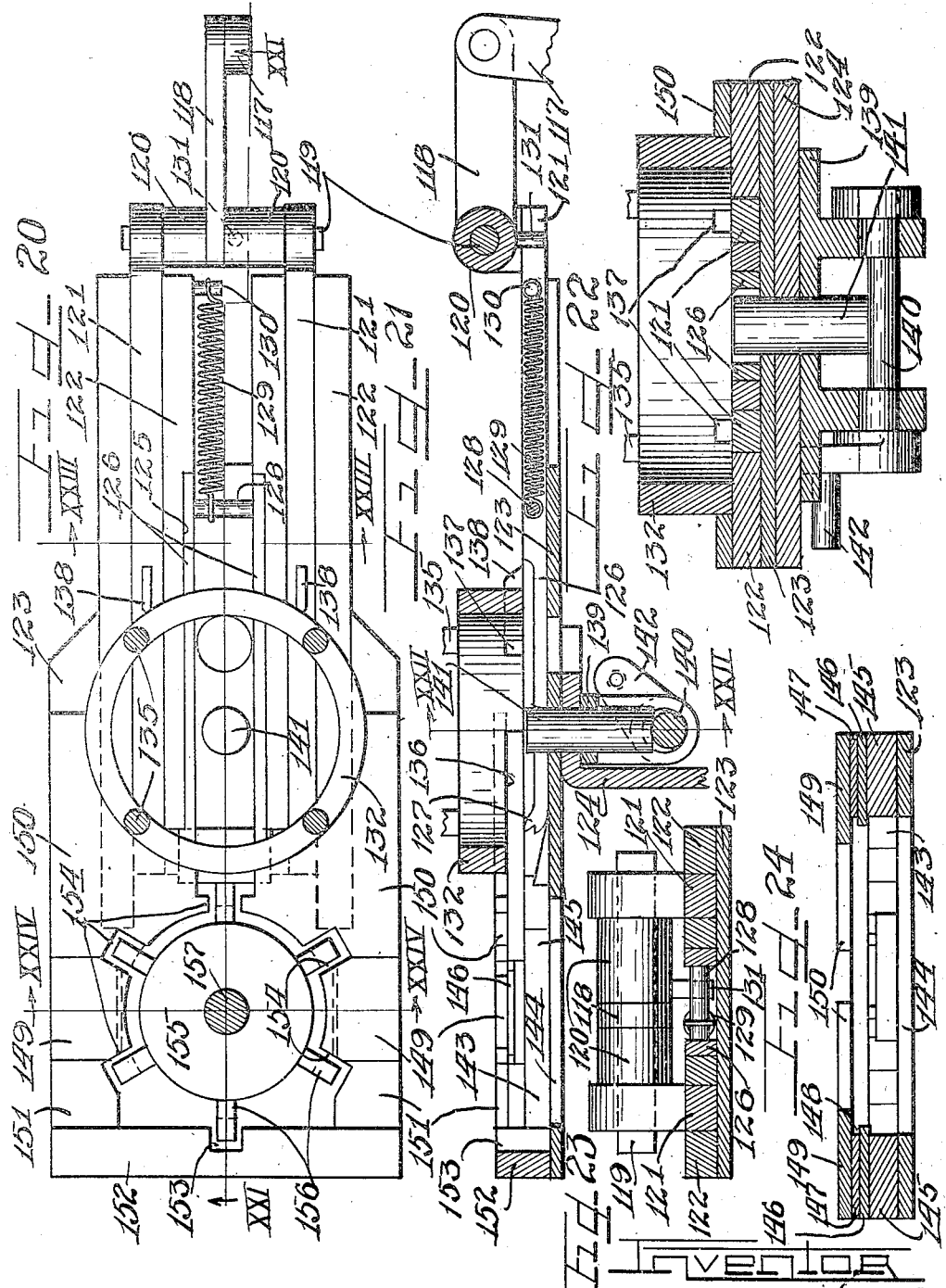

Oct. 4, 1932. C. BARBIERI 1,880,663
FILLING AND CAPPING MACHINE FOR CONTAINERS
Filed Jan. 12, 1929 11 Sheets-Sheet 11
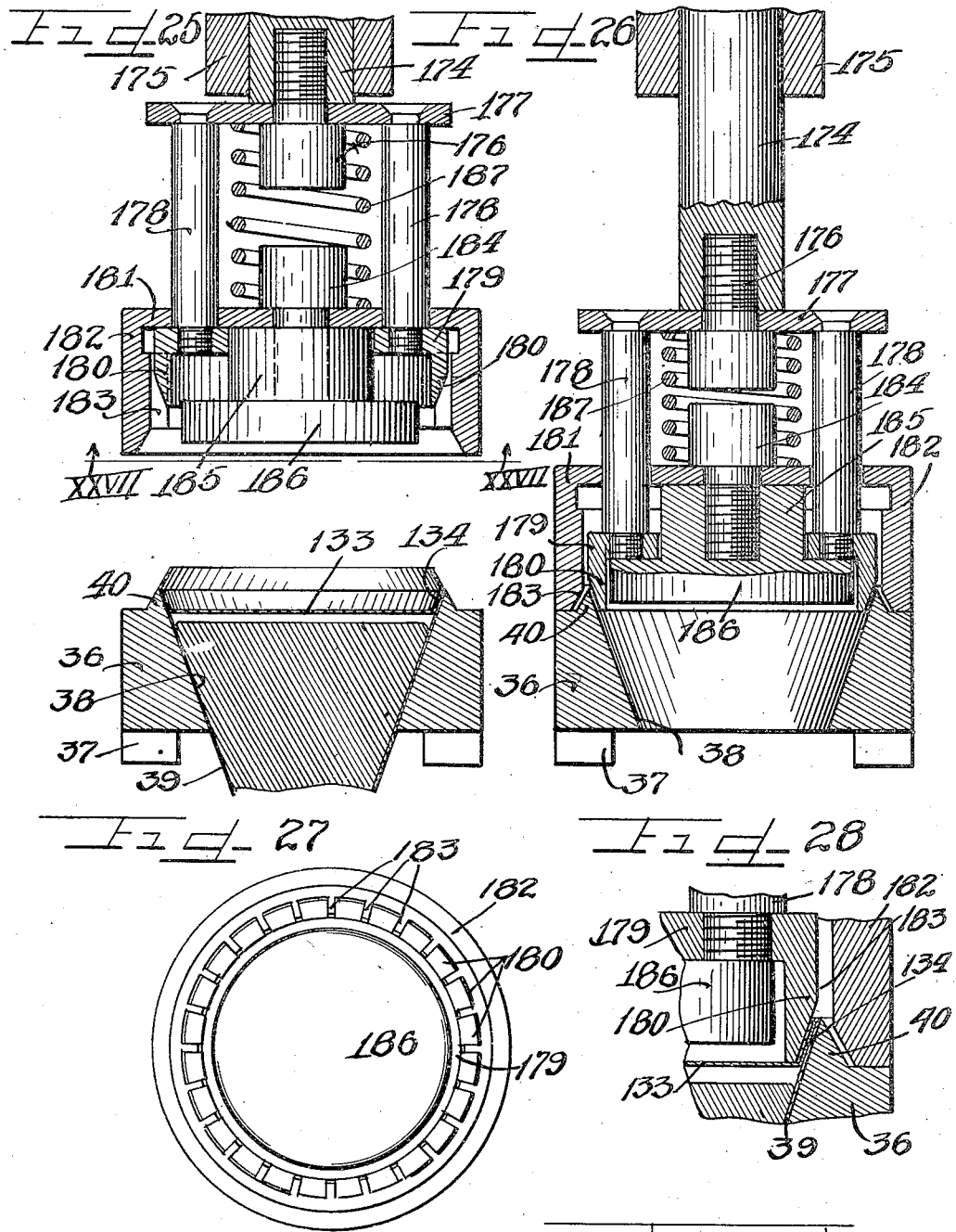

Patented Oct. 4, 1932

1,880,663

UNITED STATES PATENT OFFICE

CESARE BARBIERI, OF NEW YORK, N. Y., ASSIGNOR, BY MESNE ASSIGNMENTS, TO VORTEX CUP COMPANY, OF CHICAGO, ILLINOIS, A CORPORATION OF DELAWARE

FILLING AND CAPPING MACHINE FOR CONTAINERS

Application filed January 12, 1929. Serial No. 332,022.

This invention relates to an improved filling and capping machine for paper containers and the like, and embraces an endless conveyor type machine having a paper cup dispenser which is adapted to be operated automatically to dispense conical paper cups one at a time, depositing the cups in recesses or pockets formed in a traveling endless conveyor which is operated intermittently to advance the cups into a position beneath a hopper mechanism containing ice-cream, a drink, or any other substance which is to be dispensed in the containers. Disposed beneath the hopper is a valve control mechanism which governs the outlet of the material from the hopper, and is arranged to permit a predetermined quantity of the material to be deposited at a predetermined time in a container which is positioned in a receiving position. After a container has been filled, the endless carrier or conveyor is automatically advanced a predetermined distance to carry the filled container into a position directly beneath a rim deflecting device opposite a cap delivering mechanism which automatically acts to deliver a flanged cap above the filled container to permit the delivered cap to be fed downwardly into the container after which the deflecting device is caused to operate to deflect the margin of the container inwardly above the deposited cap. The filled container having the cap seated therein, is now again advanced a predetermined distance by the endless conveyor into a position directly beneath a crimping mechanism which is now operated automatically to cause the upper inwardly deflected margin of the container to be bent downwardly and crimped over the flange of the delivered cap to hold said cap in a locked position within the container. The filled capped container is next advanced by the movable conveyor into a position wherein the container is adapted to be readily removed from the conveyor, either manually or the container is advanced into a position wherein the container is permitted to drop by gravity out of the conveyor pocket and onto a suitable receiving rack or the like, from which the filled containers may be readily removed and properly stored or dispensed as the case may be.

It is an object of this invention to provide a filling and capping machine wherein containers are delivered to a traveling conveyor which serves to carry empty containers through the field of operation of a material dispensing attachment and then into a cap receiving position beneath a deflecting mechanism which serves to partially deflect the margin of the filled container before the same is advanced by the conveyor mechanism into another position beneath a crimping device, which acts to crimp the margin of the filled container over the cap to properly enclose and protect the contents of the container.

It is also an object of this invention to provide an automatic machine adapted to feed, fill and then cap containers in consecutive order prior to discharge from the machine.

It is a further object of this invention to provide a machine wherein a cup dispensing magazine is arranged to automatically deposit cups in pockets provided in a traveling conveyor which is controlled by a Geneva gear mechanism to cause the conveyor to rotate intermittently to advance cups one at a time into position to be automatically filled and then have caps deposited therein prior to advancing the filled cups into the field of operation of a crimping mechanism adapted to crimp the margins of the cups over the caps prior to discharge of the filled cups from the machine.

It is furthermore an object of this invention to provide a machine wherein an intermittently rotatable conveyor is adapted to carry cups in successive order below an automatically operating filling mechanism adapted to deposit a predetermined quantity of a material into a cup after which the filled cup is then advanced into a position to one side of a cap delivering mechanism to receive a cap therefrom prior to the operation of a cup rim deflecting device which acts to partially deflect the margin of the filled cup inwardly before the conveyor acts to advance the filled cup into another position wherein a crimping die device is adapted to engage the deflected margin of the cup and bend the same inwardly and crimp the same over the cap to hold the cap in position to protect the contents of the cup.

Another object of the invention is to provide a filling and capping machine wherein an endless traveling conveyor is adapted to carry cups into a position beneath a hopper having a cam controlled valve positioned therebeneath and connected with a measuring cylinder adapted to receive a predetermined quantity of material from the hopper, after which the valve is automatically closed prior to the operation of a plunger mechanism which acts automatically to force the contents of the cylinder into the cup which is then advanced by the conveyor into the field of operation of a cap feed device, a cup rim deflecting mechanism and a cup rim crimping device to cause the margin of a filled cup to be deflected and crimped over the cap within the cup.

Still another object of this invention is to provide a filling and capping machine of the endless conveyor type in which cups after being delivered into a traveling conveyor are advanced into a filling position and after being filled are carried into a position adjacent a cam controlled reciprocating cap feed device which acts transversely of the path of travel of the conveyor to automatically deposite a flanged cap in each filled cup prior to the simultaneous operation of a cup margin deflecting mechanism and a cup margin crimping mechanism which act on filled cups in different positions on the conveyor to deflect the margin of one of the cups while the deflected margin of another of the cups is being crimped over a cap to hold the same in position.

It is an important object of this invention to provide a filling and capping machine of the conveyor type in which empty cups are adapted to be delivered one at a time into receiving pockets carried on a traveling conveyor which operates intermittently to deliver the empty cups beneath an automatic filling mechanism which acts to deposit a predetermined quantity of a material into each cup after which a filled cup is again advanced by the conveyor into a position adjacent a cap delivering device which pushes a cap into a position over the filled container and beneath a deflecting mechanism which acts to push the delivered cap out of a retaining pocket and into the filled cup, which is then advanced into the field of operation of a crimping device which acts to automatically crimp the margin of the filled container over the flange of the cap seated therein to completely enclose and protect the contents of the cup prior to the removal of the filled cup from the conveyor.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of an improved container filling and capping machine embodying the principles of this invention.

Figure 2 is a side elevation of the opposite side of the machine.

Figure 3 is a top plan view of the machine.

Figure 4 is a horizontal sectional view of the machine taken on line IV—IV of Figure 1, with parts shown in elevation and with parts omitted.

Figure 5 is an enlarged vertical detailed section taken on line V—V of Figure 3 with parts broken away.

Figure 6 is an enlarged fragmentary detailed vertical section taken on line VI—VI of Figure 2.

Figure 7 is an enlarged fragmentary horizontal section taken on line VII—VII of Figure 6, and illustrating the valve control and plunger mechanism governing the feeding of material into cups carried by the conveyor.

Figure 8 is a fragmentary vertical detailed section of the material feed mechanism taken on line VIII—VIII of Figure 6.

Figure 9 is an enlarged horizontal sectional view taken on line IX—IX of Figure 2 and illustrating the interior operating mechanism of the cup feed magazine.

Figure 10 is a vertical sectional view of the cup feed magazine taken on line X—X of Figure 9.

Figure 11 is a vertical detailed sectional view taken on line XI—XI of Figure 10 and illustrating the operating mechanism within the cup feed magazine.

Figure 12 is a horizontal detailed section taken on line XII—XII of Figure 11 with the cup feed arms omitted.

Figure 13 is a fragmentary detailed section taken on line XIII—XIII of Figure 11.

Figure 14 is an enlarged side elevation of the conveyor mechanism with parts broken away taken on line XIV—XIV of Figure 3.

Figure 15 is a sectional view of the Geneva gear control mechanism taken on line XV—XV of Figure 4.

Figure 16 is an enlarged fragmentary plan view of a portion of the conveyor mechanism with parts broken away taken on line XVI—XVI of Figure 14.

Figure 17 is a fragmentary side elevation of a portion of the conveyor mechanism taken on line XVII—XVII of Figure 16.

Figure 18 is an enlarged fragmentary detailed section of the crimper mechanism control device taken on line XVIII—XVIII of Figure 1 with parts shown in elevation.

Figure 19 is an enlarged fragmentary vertical view taken on line XIX—XIX of Figure 1 ure 1 and illustrating the relation of the crimping mechanism with respect to the conveyor.

Figure 20 is a top plan view of the cap feed mechanism and the cup rim deflecting device taken on line XX—XX of Figure 5.

Figure 21 is a vertical sectional view taken on line XXI—XXI of Figure 20 with parts shown in elevation.

Figure 22 is a detailed enlarged transverse section of the cap magazine taken on line XXII—XXII of Figure 21.

Figure 23 is a fragmentary detailed section taken on line XXIII—XXIII of Figure 20.

Figure 24 is a transverse vertical detailed section of the cap guide taken on line XXIV—XXIV of Figure 20 with the cup rim deflector omitted.

Figure 25 is an enlarged vertical detailed section taken on line XXV—XXV of Figure 1 illustrating the cup crimping mechanism in its elevated position above a filled cup containing a cap below the deflected margin of the cup.

Figure 26 is a similar vertical section of the cup crimping mechanism illustrating a further step in the operation in which a cap is seated in a filled cup with the upper margin of the cup deflected or crimped over the flange of the cap to hold the same in position.

Figure 27 is a bottom plan view of the cup crimping mechanism taken on the line XXVII—XXVII of Figure 25.

Figure 28 is an enlarged fragmentary radial section taken through the crimper die mechanism and illustrating the margin of a container crimped over the flange of a cap.

Figure 29 is a bottom plan view of the crimping die removed from its holder.

Figure 30 is a bottom plan view of the cup rim deflecting die taken on line XXX—XXX of Figure 5.

Figure 31 is a side elevation of a conical cup or container of the type adapted to be conveyed through the machine to be filled and capped.

Figure 32 is a vertical section through the cup showing the same filled with a quantity of material.

Figure 33 is a similar section of a filled cup showing a flanged cap in position beneath the deflected upper margin of the cup.

Figure 34 is a similar section of a filled cup showing the deflected upper margin of the cup crimped over the flange of the cap to hold the same in place.

As shown on the drawings:

The improved conveyor type filling and capping machine for containers embodying the present invention, embraces mechanism adapted to automatically deliver cups or containers from a magazine one at a time into receiving pockets provided in a traveling endless conveyor. The conveyor is adapted to be operated intermittently to advance the empty containers one at a time beneath a filling device which is automatically controlled by valve means, whereby a predetermined quantity of a material from a hopper is delivered into a container when in its receiving position. The machine furthermore includes a cap holding magazine and a dispensing mechanism connected therewith whereby caps are automatically removed from the cap magazine and delivered transversely over the top of the conveyor above a filled container where the cap is properly centered by a deflecting die mechanism which acts to release the cap to permit the same to drop by gravity into a filled container. After the cap has been delivered into a filled container, the conveyor again acts to advance the container into a position beneath a crimping die mechanism which serves to crimp the deflected margin of the filled cup over the cap to hold the same in position. The conveyor mechanism is then permitted to operate to carry the filled capped containers around the bight portion at one end of the conveyor to permit the filled capped containers to be removed manually or drop by gravity out of the conveyor onto any suitable receiving table or chute from which they may be conveniently removed and properly packed or dispensed as the case may be.

With the above briefly mentioned operations in mind, the improved machine consists generally of a plurality of associated devices which are supported upon a metal framework consisting of end frames 1, connected at their bases by means of connecting brace rods 2. Mounted upon the longitudinal connecting rods 2 is a driving motor 3 having a driving pinion 4 secured on one end of the shaft thereof as illustrated in Figure 2. The motor 3 is adapted to be controlled by means of an electric switch which may be secured in any desired position upon the machine framework. Trained over the driving pinion 4 of the motor is a driving chain 5 which is also trained over a larger sprocket wheel 6. The sprocket wheel 6 is secured on a stub shaft 7 journalled in suitable bearings provided on one of the end sections 1. Mounted on the stub shaft 7 is a pinion 8 which is in mesh with and drives a large gear 9.

The large gear 9 is mounted on one end of a shaft 10 which is journalled in suitable bearings 11 and 12. The bearing 11 is rigidly secured on the outer side of a sill or beam 13 which is positioned longitudinally of the machine framework and has the ends thereof supported on the end frames 1. The second bearing 12 for the shaft 10 is integrally formed on the outer side of a bracket plate 14 which is rigidly supported upon the top of one of the end frames 1.

Keyed or otherwise secured on the shaft 10 adjacent the inner side of the frame sill 13 is a sprocket gear 15 around which an endless driving chain 16 is trained. The chain 16 is also trained around a sprocket 17. The sprocket 17 is keyed or otherwise secured on an auxiliary shaft 18, which is journalled in a bearing 19 secured on the inner side of the framework sill 13 and in a bearing bracket 20. The bearing bracket 20 is rigidly bolted or otherwise secured to the outer side of one of a pair of upper guide rails 21 which are disposed longitudinally of the machine and have the ends thereof secured to the upper portion of the framework end frames 1. Positioned below the upper guide rails 21 is a pair of lower guide rails 22, the ends of which are also secured to the end frames 1.

Mounted on the transverse shaft 10 to the outside of the bearing 11 is a Geneva gear 23 which coacts with a second Geneva gear 24 mounted on a shaft 25. The auxiliary shaft 25 is journalled in a bearing 26 integrally formed on the bracket plate 14 and in a bearing 27 which is rigidly secured upon one of the end frames 1 to the outside of the frame sill 13 as clearly illustrated in Figure 4. Keyed or otherwise secured on the shaft 25 to the inside of the bracket plate 14 and to the inside of the frame sill 13 is a pair of sprockets 28 around which a pair of endless conveyor chains 29 are trained. The endless conveyor chains 29 are also trained around a second pair of sprockets 30 at the opposite end of the machine. The sprockets 30 are disposed in the planes of the sprockets 28 and are supported upon a shaft 31 which is journalled in adjustable bearing blocks 32 which are slidably seated in bearing brackets 33 which are rigidly mounted in position upon one of the end frames 1. The bearing blocks 32 are adapted to be adjusted in the brackets 33 by means of screws 34 so that the sprockets 30 may be moved toward or away from the sprockets 28 to adjust the tension of the endless conveyor chains 29. The upper laps or longitudinal portions of the endless conveyor chains 29 are adapted to track over the upper pair of guide rails 21 while the lower laps or longitudinal length of the conveyor chain are adapted to track over the upper edges of the lower guide rails 22.

Rigidly secured on the inner side of the continuous conveyor chains 29 are a plurality of angle brackets 35 which are arranged in spaced relation with the angle brackets on one of the endless conveyor chains disposed opposite to the angle brackets on the other conveyor chain. Mounted on each pair of angle brackets 35 and disposed between the endless chains 29 is a cup receiving socket 36 having legs 37 arranged in pairs on the side margins of the bottom of said sprocket.

Each cup receiving socket 36 is provided with a tapered or frustum shaped recess or pocket 38 open at both ends to permit a conical cup or container 39 to be seated therein with the bottom or pointed end of the cup projecting downwardly through the socket. Integrally formed on the top of each cup receiving socket 36 is a tapered or V-cross-sectioned flange or ring 40.

Mounted on the shaft 18 adjacent the outer side of the frame sill 13 is a sprocket around which the lower bight of an endless chain 41 is trained. The upper bight of the driving chains 41 is trained around a sprocket 42 which forms a part of a cup feed mechanism which will now be described.

The automatic cup feed mechanism is adapted to be driven from the chain 41 which rotates the sprocket 42 which is engaged on a stub shaft 43 journalled in a bearing 44 forming a part of a supporting bracket 45, the legs or arms 46 of which have the lower ends rigidly secured to the frame brackets 33. Projecting from the inner side of the sprocket 42 is a cup feed control pin 47 which is adapted to coact with a pin 48, (Figure 9) once during each revolution of the sprocket 42. The pin 48 projects radially from the outer end of a cup feed control shaft 49 which is journalled in a suitable bearing 50 supported on a base ring 51 which is provided in the lower end of a cylindrical housing 52 of a cup or container holding magazine. Rigidly secured on the exterior of the magazine housing 52 is a mounting block 53 having a dovetail rib 54, integrally formed thereon as illustrated in Figure 9. The dovetailed rib 54 is frictionally engaged in a dovetailed slot 55 provided in a block 56 which is rigidly secured to the upper end of an extension bracket arm 57. The bracket arm 57 is riveted or otherwise rigidly secured to the upper surface of the supporting bracket 45 as clearly illustrated in Figure 1.

Supported on the top of the cylindrical housing 52 is a collar or ring 58 having rigidly engaged therein a sleeve 59 provided with a peripheral flange 60 adapted to seat upon the upper end of the ring 58 as clearly illustrated in Figure 10. Integrally formed on the lower end of the sleeve 59 is a toothed container supporting ring 61 upon which the lowermost cup or container of a stack of containers is adapted to seat, with the apex or lower portion of the lowermost container projecting downwardly through the toothed ring 61 into the housing 52. Secured in the sleeve 59 is the lower end of a cover or dome 62 constructed of glass or other suitable transparent material and having its upper end closed. The dome 62 is adapted to act as a covering for a stack of nested conical containers 39 which are to be dispensed from a magazine. The diameter of the mouths of the containers is greater than the diametrical distance between opposite teeth or fingers of the ring 61 so that the containers are adapted to be disposed within the dome with the side walls of the lowermost container 39 resting against the fingers or projections of the ring 61. In this position the mouth of the lowermost container is disposed above the ring 61 with the greater portion of the conical body or side walls of the lowermost container projecting into the housing 52 and exposed to the operation of container withdrawing or dispensing mechanisms hereinafter more fully described. The ring 61 is provided with teeth or projections so that when a container is drawn downwardly through the tooth ring, the upper margin of the conical wall of the container is flexed into the spaces between adjacent teeth to facilitate dispensing of the container without injury thereto.

Positioned in the rear portion of the housing 52 and connecting the base ring 51 with the toothed ring 61 is a pair of rods or posts 63. Engaged on the inner end of the container supply control shaft 49 is a crank 64 (Figure 11) to which the lower end of a gripper actuating member or connecting bar 65 is pivotally connected. The upper end of the connecting bar 65 is pivoted on a pin 66 supported in a head or block 67 which is reciprocal on the guide rods 63. Pivotally mounted on the guide rods 63 is a pair of sleeves 68 to which container gripper arms 69 are secured in a position to be oscillated transversely of the discharge path of the containers. The gripper arms 69 being formed on the sleeves 68 permit the gripper arms to be reciprocated upon the guide rods 63 to effect dispensing of a container or cup and positioning of the arms 69 for subsequent container gripping. Formed on each gripper sleeve 68 is a dog 70 with which the connecting bar 65 cooperates to effect oscillation of the gripper arms on the guide rods 63. Engaged on each of the gripper arms 69 are a plurality of rubber friction pads or bands 71, the gripping or frictional faces of which are inclined with respect to the longitudinal axis of the path of movement of the containers within the housing 52 to facilitate proper gripping of the conical walls of the lowermost container or cup in the stack. Carried on the connecting bar 65 is a gripper actuating plate 72. The dogs 70 are disposed between the connecting bar 65 and the gripper actuating plate 72 whereby the gripper sleeves 68 may be actuated to cause the gripper arms 69 to be swung transversely into a container gripping position.

In the operation of the container feed mechanism hereinbefore described, a stack of nested conical paper containers 39 is engaged in the dome 62 of the container holding magazine with the lowermost container supported by the teeth or fingers of the toothed ring 61 (Figure 10).

The lower portion of the bottom container projects downwardly between the gripper arms 69 which at this particular time in the operation should be open. A drive from the cup dispensing control chain 41 is transmitted to the sprocket 42 thereby causing rotation of the same so that with each revolution of the sprocket 42 the pin 47 (Figure 9) is brought into engagement with the pin 48 to cause the supply control shaft 49 to be rotated one revolution. When the control shaft 49 is rotated, the crank 64 serves to actuate the connecting bar 65 to cause the sleeves 68 to be reciprocated on the guide rods 63 and furthermore to cause said sleeves to be oscillated transversely of their reciprocal path. Movement of the connecting bar 65 in one direction of its oscillatory axis will cause the plate 72 to act on the dogs 70 to swing the gripper arms 69 inwardly towards one another thereby causing the resilient gripper pads 71 to be pressed into engagement with the walls of the lowermost container in the dispenser. The head 67 is so positioned that when the connecting bar 65 is operated, the sleeves 68 are caused to reciprocate on the guide rods 63 thereby causing the closed grippers to be drawn downwardly on the lowermost container to cause the same to be pulled downwardly through the tooth supporting ring 61 into the housing 52. The continued operation of the connecting bar 65 now causes the gripper arms 69 to swing outwardly away from one another thereby releasing the container and permitting the same to drop by gravity downwardly through the outlet opening in the base ring 51 of the container dispenser. When a container is dispensed from the container feed magazine, said container is adapted by gravity into a centered pocket 38 of one of the container receiving sockets 36 of the conveyor mechanism.

After a container has been deposited within one of the container receiving sockets of the conveyor mechanism, said conveyor mechanism is adapted to be advanced a predetermined distance due to the action of the Geneva gears 23 and 24 which receive a drive from the shaft 10. With each operation of the conveyor mechanism, the container carried thereby is advanced an additional step toward a container filling position beneath a filling attachment.

The cup filling mechanisms will now be described. Secured on the shaft 18 to the outside of the chain 41 is an eccentric disc 73 which carries an eccentric pin 74 on which a connecting bar 75 is pivotally supported intermediate its ends. One end of the connecting rod or bar 75 is provided with a longitudinally disposed slot 76 (Figure 2) through which a pin 77 projects. The pin 77 projects outwardly from the outer side of one of the arms 78 of a yoke 79 which straddles the machine to permit the lower ends of the yoke arms 78 to be pivotally mounted on the ends of a stub shaft 80 journalled in brackets 81 secured to the legs of one of the end frames 1. Supported by the yoke arms 78 (Figure 7) is a transverse shaft 82. Rigidly secured on the frame sill 13 is a bracket 83 which extends upwardly and is directed over the top of the continuous conveyor as clearly illustrated in Figure 6. Mounted upon the bracket 83 and disposed longitudinally with respect to the conveyor mechanism is a plunger housing 84 provided with a pair of parallel material receiving and measuring chambers 85 in which plungers or pistons 86 are adapted to be reciprocated. Pivotally connected in the plungers 86 are a pair of plunger rods 87, the outer ends of which are provided with sleeves 88 which are pivotally engaged on the shaft 82 as clearly illustrated in Figures 7 and 8. The sleeves 88 are held in proper spaced relation on the shaft 82 by means of spacer collars 89 secured on said shaft. Integrally formed on the front end of the plunger housing 84 is a valve housing 90 which is disposed above the upper lap of the conveyor mechanism. Pivotally mounted within a valve recess within the valve housing 90 is a material control valve 91 having a pair of material receiving pockets 92 formed therein and adapted to register with the material receiving compartments 85 when the valve is in closed position. Formed in the bottom of the valve housing 90 is a material discharge opening or passage 93. The upper end of the valve housing 90 is provided with a tapered material receiving passage 94 with which a material feed passage 95 registers. The material feed passage 95 is tapered and is formed within a base 96 of a material supply hopper or tank 97. The base of the hopper 97 is rigidly secured upon the top of the housing 84.

Engaged on one projecting end of the material control valve 91 is a valve operating crank arm 98 to the end of which a connecting link 99 is pivotally connected. The lower end of the connecting link 99 is provided with a longitudinally disposed slot 100 through which a pin 101 projects. The pin 101 is rigidly secured in one end of the control bar 75 and projects outwardly at right angles from one side of said connecting bar.

Journalled in suitable bearings 102 formed on the base 96 of the hopper 97 is an agitator shaft 103 on which an agitator 104 is secured and is disposed within the outlet chamber 95 as clearly illustrated in Figure 6. Secured on one projecting end of the agitator shaft 103 is a crank arm 105 having a pin 106 projecting from one end thereof. Pivotally mounted on the pin 106 is the upper end of a connecting link 107 having a longitudinal slot 108 through which a pin 109 projects. The pin 109 is eccentrically positioned at one end of the control valve 91 (Figure 1).

A brief description of the container filling mechanisms will now be given. When a container is moved by the conveyor mechanism into a filling position beneath the valve discharge opening 93, the valve 91 which is controlled by the eccentric disk 73 is moved from a closed position with respect to the discharge passage 93 into an open position with respect to the outlet passages 94 and 95 of the hopper 97. With the valve 91 in its closed position with respect to the discharge passage 93 and opened with respect to the outlet passages 94 and 95, ice-cream, a liquid, or any other substance within the hopper 97 is adapted to flow downwardly by gravity through the passages 95 and 94 through the valve chambers 92 and into the measuring chambers or passages 85 of the housing 84. When the measuring passages or chambers 85 are being filled with a quantity of material, the plungers 86 are in their retracted position which is governed by the eccentric disk 73 operating the connecting bar 75 and the yoke member 78—79 which carries the shaft 82 from which the plunger rods 87 are connected. It will thus be noted that predetermined quantities of the material are permitted to be fed into the measuring chambers 85 ready to be delivered into empty containers when reaching the filling position beneath the discharge opening 93 of the material feed mechanism.

With the inward swinging movement of the yoke 79 controlled by the operation of the essentric disk 73, the plunger rods 87 are moved inwardly in the housing 84 thereby causing the plungers 86 to slide inwardly. At this point in the operation, the eccentric disk 73 operating the cross bar 75 and the link 99 actuates the valve crank 98 causing the material control valve 91 to be partially rotated into an open position as illustrated in Figure 8 in which position the valve 91 closes the outlet passage 94 from the hopper 97 and positions the valve openings 92 in communicating relation with the discharge outlet 93. With the valve 91 positioned in its discharge position, the plungers 86 moving through the measuring passages 85 cause the material therein to be discharged or pushed outwardly through the valve passages 92 into the material discharge passage 93 permitting the material to be deposited in the centered container which is positioned in a filling position. It will thus be noted that a predetermined quantity of ice-cream or other material measured by the measuring chambers 85 is thus automatically deposited into a container when in a filling position. After a container has been filled with a predetermined quantity of material, the conveyor mechanism is again advanced a predetermined distance due to the operation of the Geneva gear mechanisms 23 and 24 so that the filled container is advanced from beneath the filling mechanism to permit another container to be moved into place beneath the material discharge passage 93. With each advance of the conveyor mechanism, a container is moved into a filling position so that a plurality of containers are filled and advanced intermittently through the machine toward a cap dispensing unit forming a part of the machine.

The cap dispensing and delivering mechanisms will now be described. Rigidly secured by bolts or other suitable means to the outer side of the frame sill 13 is a downwardly directed bracket 110 (Figure 5) on the outer end of which a sleeve 111 is formed. Journalled in the sleeve 111 is a stub shaft 112 on one end of which a crank arm 113 is rigidly secured. Engaged in the upper end of the crank arm 113 is a pin 114 positioned to project between a pair of parallel cam rings 115 supported by means of a plurality of posts 116, the inner ends of which are rigidly secured at right angles to the outer side of the spokes of the large gear 9.

Rigidly supported on the opposite end of the stub shaft 12 is the lower end of a lever 117 which is used to actuate the cap feed mechanism. The upper end of the lever 117 is pivotally connected to one end of a link bar 118, the opposite end of which is pivotally engaged on a stub shaft 119 having spacer sleeves 120 engaged thereon on opposite sides of said link 118. The ends of the stub shaft 119 are supported in the outer ends of a pair of parallel slide bars 121 which are slidably disposed in parallel grooves provided in a pair of guide sills 122 secured upon a table or shelf plate 123 which in turn is supported upon a bracket 124. Formed in the inner margin of each of the guide sills 122 is a slot 125 (Figure 20) having a slidable cap feed arm 126 seated therein and slidably supported upon the shelf 123. A notched cap feed or ejecting head 127 is integrally formed on one end of each of the cap feed arms 126 as clearly illustrated in Figure 21. The outer ends of the two feed bars or arms 126 are connected by means of a pin or post 128 to which one end of a coiled spring 129 is attached. The outer end of the coiled spring 129 (Figure 20) is attached to a pin 130 projecting from the side margin of one of the guide sills 122. Projecting from the bottom of one of the spacer sleeves 120 is a downwardly directed pin 131 (Figure 21) which is adapted on the inward movement of the slide bars 121 to be brought into engagement with the cross pin 128 to slide the two cap feed arms 126 beneath the base 132 of a cap holding magazine.

The cap magazine base 132 is supported upon the guide sills 122 and is adapted to carry a stack of nested caps 133 each of which is provided with a peripheral flange 134. The stack of nested caps is adapted to be held in a vertical position between a plurality of upright posts 135 secured at spaced intervals upon the top of the base 132 of the magazine. The magazine base 132 is provided with a cap outlet opening 136 in the bottom of one side thereof through which opening the caps are adapted to be ejected. Also provided in the magazine base 132 are two spaced openings 137 (Figure 22) through which a pair of cap ejecting dogs or bosses 138 are adapted to slide to grip or engage against the flange of the lowermost cap in the stack of caps within the magazine. The dogs or bosses 138 are mounted longitudinally upon the top of the slide bars 121.

In case the caps within the magazine become jammed in the bottom thereof, a manually controlled release mechanism is provided whereby the stack of caps may be lifted in the magazine to permit removal of the caps which are jammed. Mounted beneath the horizontal portion of the bracket 124 is a bearing bracket 139 in which an eccentric shaft 140 is journalled. Resting on the eccentric shaft 140 is the lower end of a release plunger or pin 141 (Figure 22) which projects upwardly through suitable openings in the bracket 124 and in the table or shelf 123 with the upper end of said plunger disposed slightly below the top surfaces of the cap feed arms 126. Engaged on one projecting end of the eccentric shaft 140 is a crank arm 142 to facilitate rotation of the eccentric shaft to cause the plunger 141 to be raised against the bottom of the stack of caps in the magazine to raise the stack of caps when necessary.

When the large gear 9 is rotated, the cam rings 115 are rotated therewith and co-act with the cam pin 114 (Figure 5) to cause the lever 117 to swing inwardly thereby slidably moving the feed bars 121 inwardly so that the feed dogs 138 slide through the openings 137 of the cap magazine base and engage against the outer peripheral surface of the flange of the lowermost cap in the stack of caps within the magazine. The continued inward movement of the feed arms 121 causes the dogs 138 to raise the stack of caps within the magazine and slide the lowermost cap transversely through the base of the magazine toward the discharge opening 136. The lowermost cap is thus partially ejected from the magazine base and with the continued advance of the slide bars 121 the pin 131 is moved into engagement with the transverse shaft or pin 128 (Figure 20) so that the movement is transferred to the feed arms 126 against the action of the spring 129. The pair of feed arms 126 are thus slidably advanced in the grooves 125 causing the notched heads 127 of the feed arms to engage against the partially ejected cap to complete the removal of the cap from the magazine and properly advance the ejected cap into a cap centering chamber 143.

The cap receiving chamber 143 is located directly above a cap outlet opening 144 formed in the table 123. The chamber 143 is formed between a pair of sills or blocks 145 supported longitudinally upon the table 123 as illustrated in Figure 24. Mounted upon the sills 145 are plates 146 and 147 with the inner margins of the plates 146 projecting beyond the inner margin of the plates 147 to afford guide grooves 148 in which the margin of the flange of a cap is adapted to slide to hold a cap in centered position beneath overhanging upper plates 149 secured upon the top of the plates 147. Also supported upon the tops of the plates 147 in the plane of the overhanging plates 149 are a pair of plates 150 and a pair of smaller plates 151 as illustrated in Figure 20. Secured transversely across the table 123 is an end bar 152 provided with a notch 153. The plates 149, 150 and 151 are disposed in the same plane and abut one another as illustrated in Figure 20 and are provided with a plurality of notches or recesses 154. The notches 154 together with the notch 153 are arranged radially with respect to one another and are positioned approximately 60° apart. When a flanged cap 133 is pushed outwardly into the chamber 143, the cap is positioned beneath the inner arcuate margins of the upper plates 149 with the margins of the flange of the cap seated in the grooves 148 thereby holding the cap in a centered position above the discharge opening 144 in the table 123.

With a flanged cap discharged from the cap feed magazine and positioned in a centered position within the chamber 143, a cap discharge and container rim deflecting mechanism is next brought into operation to cause the cap to be discharged through the opening 144 into a filled container positioned in a cap receiving position before the deflecting device engages the upper margin or rim of the container to deflect the same inwardly.

The container rim deflecting mechanism consists of a plunger head 155 having integrally formed on the periphery thereof a plurality of radially directed deflecting teeth 156 which are provided with beveled extensions which project downwardly beneath the bottom surface of the die or head 155 as clearly illustrated in Figure 5. The rim deflecting teeth 156 are radially positioned with respect to the die head 155 and are spaced approximately 60° apart to permit the deflecting teeth to pass downwardly through the notches 154 and 153 (Figure 20) into the cap holding chamber 143 to permit the teeth to engage a centered cap and force the same out of the grooves 148 and through the discharge opening 144 thereby allowing the discharged cap to drop by gravity into a filled container.

The deflecting die or head 155 is secured on the lower end of a vertically positioned shaft 157 which is secured in a collar or sleeve 158 integrally formed on one end of a horizontally positioned reciprocating beam 159.

The reciprocating beam 159 is provided with an intermediate collar or sleeve 160 and an end collar or sleeve 161. Rigidly secured in the intermediate collar 160 is the upper end of a guide rod 162 the lower portion of which is slidably engaged in a guide sleeve 163. The guide sleeve 163 is integrally formed on one side of a bracket 164 which is rigidly secured upon a bracket arm 165 which projects upwardly and forms a part of the machine framework.

Projecting from one side of the reciprocating beam 159 is a pivot pin or screw 166 (Figures 1 and 18) on which the upper end of a link 167 is pivotally supported. The lower end of the link 167 is pivotally connected eccentrically to an eccentric disc 168 which is keyed or otherwise secured on the inner end of a shaft 169 journalled in a horizontal bearing sleeve 170 forming a part of the bracket 164. Secured on the outer end of the shaft 169 is a sprocket 171 around which an endless chain 172 is trained. The chain 172 is extended downwardly and is trained around a sprocket 173 which is secured upon the driving shaft 10 between the large gear 9 and the Geneva gear 23.

When a flanged cap has been deposited in a filled container beneath the container rim deflecting device, the eccentric disc 168 acting through the connecting link 167 causes the horizontal beam 159 to be moved downwardly thereby causing the deflecting die head 155 to move downwardly through the opening afforded by the plates 149, 150, and 151 (Figure 20) through the chamber 143 and through the table opening 144 to permit the beveled deflecting teeth 156 to engage the upper margin of the filled container to partially deflect the margin of the container inwardly as illustrated in Figure 33 to partially project over the flange of the cap 133 deposited in the filled container. After the margin of a filled container has been deflected as described, the deflecting die is raised and the endless conveyor mechanism is again intermittently advanced to carry the filled container having a deflected margin into a margin or rim crimping position beneath a crimping mechanism which will now be described.

Rigidly secured in the collar or sleeve 161 formed on one end of the beam 159 is the upper end of a plunger shaft or rod 174 which slidably projects through a guide sleeve 175 which is integrally formed on the bracket 164 and is parallel to the guide sleeve 163 as clearly illustrated in Figure 1. Secured to the lower end of the plunger shaft 174 by means of a bolt 176 is a crimper control plate or disc 177. Rigidly secured to the crimper control plate 177 are the upper ends of a pair of diametrically opposite parallel posts 178.

Rigidly supported on the lower threaded end of the posts 178 is a crimping die 179 provided with a plurality of spaced peripheral crimping teeth 180. Slidably mounted on the two guide posts 178 is an apertured rim deflecting hood 181 provided with an integral downwardly directed peripheral flange 182 having a plurality of spaced teeth 183 integrally formed on the inner peripheral surface thereof to slidably interfit with the crimping teeth 180 formed on the crimping die 179. Secured centrally by means of a bolt 184 within the crimping hood 181 is the shank 185 of a plunger head 186. As clearly illustrated in Figures 25 and 26, the crimping die 179 is slidably positioned around the shank 185 between the crimper hood 181 and the plunger head 186. Positioned between the top of the crimper hood 181 and below the crimper control plate 177 is a coiled spring 187 which is so positioned that it surrounds the heads of the bolts 176 and 184.

With a filled cup containing a flanged cap in centered position beneath the rim deflecting and crimping mechanisms the control eccentric disc 168 operating the connecting link 167 causes the beam 159 to be lowered thereby sliding the plunger shaft or rod 174 downwardly through the guide sleeve 175 from the position illustrated in Figure 25 into the position illustrated in Figure 26. The spring 187 normally acts to hold the toothed crimper die 179 raised into contact with the inner face of the crimper hood 181 as shown in Figure 25 and out of contact with the plunger head 186. It will thus be noted that the crimper die 179 is normally in a retracted position within the crimper hood so that as the crimping mechanism descends toward the centered filled container carried by the conveyor mechanism the lower end of the crimper housing is first brought into contact with the top surface of the container receiving socket 36 thereby positioning the plunger head 186 directly above the cap 133 to hold the same in position above the contents of the container. With the continued downward movement of the crimper mechanism there is a relative sliding movement which takes place between the crimper die 179 and the crimper housing 181 due to the fact that the crimper housing is now stationary and resting upon the socket 36. The control spring 187 is thus compressed and the crimper die 179 moves outwardly with respect to the crimper hood 181 thereby causing the crimper teeth 180 to slidably move between the teeth 183 of the crimper hood. As the crimper teeth 180 move outwardly they are brought into contact with the partially deflected rim or margin of the filled container and cause said margin of the container to be crimped over the flange 134 of the cap 133 as clearly illustrated in Figures 28 and 34.

After a crimping operation takes place the beam 159 is moved upwardly due to the action of the control eccentric disc 168 thereby causing the crimper mechanism to be elevated out of contacting engagement with the upper end of the filled capped container. At this stage in the operation the Geneva gears 23 and 24 again act to cause the conveyor mechanism to be advanced a predetermined distance thereby carrying the filled capped container around the bight portion at the discharge end of the machine thus permitting the filled capped container to be either removed manually one at a time from the holders or sockets 36 or permitting said filled containers to be discharged by gravity in an inverted position onto a suitable receiving table or onto a delivering conveyor as the case may be.

The operation of the machine is continuous while the container carrying conveyor, the container feed mechanism, the container filling devices, the cap feed, rim deflecting and rim crimping mechanisms are adapted to be operated intermittently due to the novel arrangement of the control mechanisms which govern the various devices. By referring to Figures 1 and 2, it will be noted that a plurality of containers or cups are adapted to be automatically delivered to the conveyor and then filled and capped in succession during the travel of a container from one end of the machine to the other end of the machine through the fields of operation of the various attachments forming part of the machine. The filled containers after having the margins thereof crimped over the flanged caps are thus intermittently carried successively around the discharge end of the conveyor mechanism so that the filled containers may be removed or discharged one at a time from the machine.

It will be apparent that many changes may be made and numerous details of construction may be varied through a wide range without departing from the principles of this invention, and it is therefore not purposed limiting the patent granted hereon otherwise than necessitated by the scope of the appended claims.

I claim as my invention:

1. A container capping machine comprising a traveling endless conveyor mechanism having container receiving sockets thereon for carrying filled containers, means for intermittently operating the conveyor mechanism to consecutively carry the filled containers into a cap receiving position, a cap feed mechanism, means for intermittently operating the same to cause a cap to be delivered into a filled container carried by the conveyor mechanism, a container rim deflecting device, a reciprocating support therefor, eccentric means for operating the same to cause the margins of the container to be partially deflected by the deflecting device over the cap delivered into said container, and a crimping mechanism carried on said support and operable thereby to cause the deflected margin of the container to be crimped over the flange of the cap.

2. A container capping machine comprising an intermittently traveling continuous conveyor adapted to carry filled containers, a mechanism for automatically delivering a cap into a filled container on said conveyor, a reciprocating support, eccentric means for operating the same, and a rim deflecting device, and a crimping mechanism carried by said support and positioned above said conveyor to automatically deflect the rim of a filled container in one position on the conveyor and at the same time crimp a deflected rim over a cap in another container on the conveyor to hold the cap in position.

3. A container capping machine comprising an intermittently traveling endless conveyor adapted to carry filled containers, means for operating the same, a cap supply mechanism, reciprocating means for removing a cap from said cap supply mechanism and transferring the same into a filled container when in one position during the travel of said conveyor, means for automatically deflecting the rim of the container in said same position, mechanisms at an advanced position of the container for crimping the rim of the filled container over the cap seated therein to hold said cap in position, and an eccentrically operated reciprocating support for said deflecting means and said crimping mechanism.

4. A container capping machine comprising a framework, a continuous conveyor movably mounted thereon and having container receiver sockets therein for carrying filled containers, a cap dispenser, cam controlled means for pushing a cap from said cap dispenser and transferring the cap into a filled container, a rim deflecting device, a crimping mechanism, and eccentric control means for governing the operation of said deflecting device and said crimping mechanism to cause the same to first deflect a rim of a filled container and then crimp said deflected rim over a deposited cap in the container.

5. A container capping machine comprising a traveling endless conveyor for carrying filled containers, means for intermittently rotating the same, a cap dispenser, reciprocating means for pushing caps from the cap dispenser, means for transferring the caps into the filled containers carried by said conveyor, deflecting and crimping mechanisms above the conveyor, a reciprocating member supporting the same, and eccentric control means for operating said member and the deflecting and crimping mechanisms to cause the same to automatically deflect the upper margins of the filled containers and then crimp said deflected margins over the caps deposited with the containers.

6. A container capping machine comprising a movable endless conveyor, sockets carried thereby for carrying filled containers, cam controlled reciprocating means for automatically depositing flanged caps within the filled containers, a rim deflecting device, a crimping mechanism, a reciprocating beam supporting the deflecting device and said crimping mechanism, and eccentric means for operating said deflecting device and said crimping mechanism to cause the same to deflect the margins of containers and then crimp the same over the flanges of the caps in said containers.

7. A container capping machine comprising an endless conveyor for carrying filled containers, cam controlled means movable transversely of the conveyor for delivering flanged caps into the filled containers, a rim deflecting device, a crimping mechanism, a reciprocating beam for supporting the deflecting device and said crimping mechanism, an eccentric connected with said beam to control the operation thereof, and driving means for actuating said eccentric to cause the deflecting device to deflect the rim of one container while the crimping mechanism crimps the deflected rim of another container over the flange of the cap therein.

8. A container capping machine comprising a conveyor adapted to carry filled containers, a reciprocating cap transfer device adapted to automatically deposit flanged caps in the filled containers, a driving gear, cam members carried thereby for operating said cap transfer device, deflecting and crimping mechanisms positioned at spaced intervals above the conveyor to automatically deflect the margins of the filled containers and crimp said deflected margins over the flanges of the caps deposited within the filled containers, a reciprocating beam for carrying said mechanisms, and eccentric control means for operating said beam for governing the operation of said deflecting and crimping mechanisms.

9. A container capping machine comprising a traveling conveyor adapted to carry filled containers, a cap dispenser, a slidable feed device co-acting therewith, cam means for operating the same to cause a cap to be pushed out of said cap dispenser and over a filled container in said conveyor, a deflecting mechanism above said conveyor at the position of delivery of said cap, a rim crimping mechanism above the conveyor, a reciprocating beam for supporting said deflecting mechanism and said crimping mechanism, a link connected to said beam, an eccentric disk connected with said link, and means for rotating said disk to cause operation of said beam and the mechanisms supported thereon to cause the deflecting mechanism to deliver a cap into a container and deflect the rim of the container while the crimping mechanism acts on another container to crimp the deflected rim thereof over the flange of the cap therein.

10. A container capping machine comprising a traveling conveyor adapted to carry filled containers, means for automatically delivering flanged caps into the filled containers, means for inwardly deflecting the upper margins of the containers, crimping means adapted to automatically crimp the margins of the filled containers over the caps, and eccentrically operated supporting means for the deflecting means and said crimping means.

11. In a machine of the class described the combination with an intermittently traveling endless conveyor adapted to carry filled containers, cam controlled reciprocating means for delivering flanged caps in the filled containers, a reciprocating support, and mechanisms supported thereon adapted to act on two containers carried by the conveyor to deflect the rim of one container and crimp the deflected rim of another container over the cap therein.

12. A container capping machine comprising a movable endless conveyor adapted to carry filled containers, a cap feed device adapted to automatically deliver flanged caps over the filled containers, a device for pushing the caps into the containers and deflecting the rims of said container, a crimping mechanism for crimping the deflected rims of the containers over the flanges of the caps, and eccentrically operated means for simultaneously actuating said deflecting device and said crimping mechanism.

13. A cup capping device comprising an intermittently movable endless conveyor adapted to carry filled containers, a cap holding magazine, a cam controlled reciprocating means slidable transversely in said magazine for automatically delivering flanged caps over the filled containers, means for pushing the caps into the containers and then deflecting the upper margins of the containers, and eccentrically controlled reciprocating means for crimping the deflected margins of said containers over said caps to hold the same in place.

14. A container capping machine comprising a movable carrier for carrying filled containers, means for delivering caps over the filled containers, a beam, means connected therewith to reciprocate the same, a deflecting die mechanism on one end of said beam adapted to deliver the caps into the containers and deflect the rims of said containers, and a crimping die mechanism on the other end of the beam to crimp the deflected margins of the container over the caps to protect the contents of the containers.

15. A container capping machine comprising an intermittently movable carrier adapted to carry filled containers, means adapted to deliver caps over the filled containers, a vertically reciprocating beam, means for operating the same, means on one end of said beam for pushing caps into the containers and deflecting the rims of the containers, and means on the other end of said beam for crimping the deflected rims over the caps.

16. A container capping machine comprising an intermittently movable carrier adapted to carry filled containers, a cap dispenser, means for removing caps from said cap dispenser and delivering said caps over the filled containers, a reciprocating beam, means for intermittently operating the same, and mechanisms at both ends of said beam for delivering the caps into the containers and inwardly deflecting the container rims in one position on said carrier and crimping the deflected rims of said containers over the caps in another position on the carrier.

17. A container capping machine comprising an endless conveyor, means for intermittently rotating the same, holders mounted on said conveyor adapted to carry filled containers, a cap magazine, means for elevating the caps within said cap container, means slidable through the bottom of the magazine for removing a cap from said cap magazine and delivering said cap over a filled container, mechanisms for delivering the transferred cap into a filled container and then deflecting the margin of said container, a crimping device for crimping the margin of the container over the cap, a reciprocating beam for actuating said mechanisms and said device, an eccentric control for said beam, and means for operating said eccentric control.

18. In a container capping machine of the class described the combination with an intermittently movable endless chain conveyor adapted to carry filled containers, of means for operating the same, means for delivering caps in a centered position over the conveyor, a reciprocating rim deflecting device for pushing the caps into the containers and deflecting the rims of the containers, a crimping device for crimping the deflected rims over said caps, a guide bracket, a beam vertically adjustable thereon and supporting said devices, and means for governing the operation of said beam.

19. In a machine of the class described the combination with a movable container carrier adapted to carry a plurality of filled containers, a cap dispenser, spring controlled pusher arms slidably mounted in the bottom of said cap dispenser, a lever for operating the same to cause the lowermost cap in the cap dispenser to be pushed therefrom into a centered position over a filled container, a shaft supporting said lever, a crank arm on said shaft, a rotatable driving member, a pair of cam rings supported thereon, a pin on said crank arm positioned between said cam rings to be actuated thereby, means for delivering a cap into a container and mechanisms for first deflecting and then crimping the rim of the container over the cap therein.

20. In a machine of the class described the combination with an endless conveyor adapted to carry filled containers, a cap holding magazine, a slidable cap feed device operating therethrough adapted to remove a cap from the cap magazine and transfer the same into a centered position over a filled container, means for operating the cap feed device, a cam for controlling the operation of said means at a predetermined time, a gear supporting said cam, driving means for operating said gear, a vertically adjustable horizontal member, eccentric control means connecting said member with the driving means, and mechanisms supported on both ends of said member adapted to deliver the centered cap into a filled container and deflect the container rim and then crimp the deflected rim over the cap.

21. In a machine of the class described the combination with a traveling endless conveyor adapted to carry filled containers, a cap magazine, a reciprocating device slidable through said magazine, cam means for operating said device to cause the same to push a cap out of the magazine into a centered position over a filled container, a deflecting mechanism adapted to push the cap into a filled container and then deflect a margin of the filled container, a crimping device adapted to engage the deflected margin of a container and crimp said margin over the cap deposited within the filled container, a vertically movable member supporting said deflecting mechanism and said crimping device, and an eccentric for reciprocating said member.

22. In a machine of the class described the combination with an endless conveyor adapted to carry a plurality of filled containers, of a cap supply magazine, a horizontally reciprocating device adapted to remove a cap from the cap supply magazine and transfer the cap over the filled container, a reciprocating die adapted to deliver said cap into the container and then deflect the margin of the container, and a second reciprocating die adapted to act on the deflected rim of the container to crimp the deflected rim over said cap.

23. In a machine of the class described the combination with a mechanism for carrying filled containers, of a cap supply magazine, a reciprocating transfer device slidably mounted to project through the base of said magazine, cam means for operating the same to cause a cap to be removed from said cap magazine and deliver the cap over a filled container, means for pushing the cap into the container and deflecting the margin of said container inwardly, and a crimper device adapted to cause the deflected margin of the filled container to be crimped over the cap to hold the same secured within the container.

24. In a machine of the class described the combination with an endless conveyor adapted to carry a filled container, a cap magazine, a horizontally reciprocating transfer device adapted to push a cap from the magazine and deliver the cap over the filled container, reciprocating deflecting and crimping mechanisms carried by said transfer device, a beam for supporting said mechanisms, a link pivotally connected at one end to said beam, a disk having the other end of said link eccentrically connected thereto, and means for driving said disk to cause the deflecting and crimping mechanisms to first deliver the cap into the filled container and then deflect the rim of the container and later crimp the deflected rim over the cap after the filled container has been advanced out of the cap receiving position.

25. In a filling machine of the class described the combination with means for carrying a filled container, of a cap magazine, notched arms slidably mounted to project therethrough, means for operating said arms to cause a stack of caps within the magazine to be raised each time a cap is removed from the bottom of the stack, means for reciprocating said arms, cams for actuating said means to cause the arms to transfer the removed cap over a filled container, means adapted to deliver the cap into a filled container and then deflect the margin of the container inwardly, and means acting to crimp the margin of the filled container over the cap delivered therein.

26. In a machine of the class described the combination with a cap magazine adapted to carry a stack of caps, of a feed mechanism for elevating the stack of caps in said magazine a predetermined amount to push the lowermost cap out of the magazine, cam means for operating the same, a reciprocating beam, guide means therefor, means for reciprocating said beam, a rim deflecting device mounted on one end of said beam, a rim crimping mechanism supported on the other end of said beam, and an intermittently advancing carrier adapted to first carry a filled container into a position to receive a cap and have the rim of the container deflected by said deflecting device and then carry the container into the field of operation of said crimping mechanism to have the deflected rim crimped over the cap.

27. In a machine of the class described the combination with a carrier adapted to advance filled containers, a cap supply device, a reciprocating transfer device for removing a cap from the cap magazine, cam means for actuating the transfer device to cause the same to deliver the cap over a filled container, a deflector for delivering the cap into the filled container and then deflecting the container rim, a crimper for crimping the deflected rim over the cap, eccentric control means for governing the operation of said deflector and crimper, and driving means for actuating said eccentric control means.

28. In a machine of the class described the combination with a cap magazine adapted to support a stack of nested caps, a feed mechanism for raising the stack of caps in said magazine and pushing the lowermost cap out of the magazine and over a filled container, a deflecting device for pushing the cap into the container and deflecting the rim of said container inwardly, a pivoted lever mechanism for actuating said deflecting device, a driving gear, a pair of spaced parallel cam rings supported on one side of said driving gear, a pin connected to said lever mechanism and projecting between said parallel cams to receive a drive therefrom, a drive shaft supporting said gear, a crimping device, an eccentric for operating the same to cause the deflected rim of the container to be crimped over the cap, and means for connecting said eccentric to said drive shaft.

29. In a container capping machine of the class described, the combination with a traveling endless carrier adapted to carry a filled container, a reciprocating cap feed device, means for operating the carrier to cause the filled container to be moved into a capping position, cap gripping arms forming a part of said cap feed device, means for actuating said arms to cause the same to push the cap over a filled container, a deflector adapted to deliver the cap into the container and then deflect the container rim, and crimping mechanisms adapted to be operated with the lowering thereof to cause the deflected rim of the filled container to be crimped over the cap delivered thereto.

In testimony whereof I have hereunto subscribed my name at New York, New York county, New York.

CESARE BARBIERI.